United States Patent [19]

Bielefeldt

[11] 4,205,965
[45] Jun. 3, 1980

[54] APPARATUS AND METHOD FOR SEPARATING A SPECIFIC LIGHTER COMPONENT FROM A FLOWING MEDIUM

[75] Inventor: Ernst-August Bielefeldt, Hollenstedt, Fed. Rep. of Germany

[73] Assignee: Messerschmitt-Boelkow-Blohm Gesellschaft mit beschraenkter Haftung, Munich, Fed. Rep. of Germany

[21] Appl. No.: 910,580

[22] Filed: May 30, 1978

Related U.S. Application Data

[63] Continuation-in-part of Ser. No. 717,148, Aug. 24, 1976, abandoned.

[30] Foreign Application Priority Data

Aug. 30, 1975 [DE] Fed. Rep. of Germany ....... 2538664

[51] Int. Cl.$^2$ .............................................. B01D 45/12
[52] U.S. Cl. .......................................... 55/1; 55/412; 55/414; 55/439; 55/459 R; 209/144
[58] Field of Search ............... 55/1, 17, 439, 412–416, 55/449, 457, 459 R, 460, 461; 209/144, 211; 210/512 R

[56] References Cited

U.S. PATENT DOCUMENTS

| 474,490 | 5/1892 | Walter ................................ 55/412 |
| 768,190 | 8/1904 | Naylor, Jr. ....................... 55/457 X |
| 819,171 | 5/1906 | Robinson ...................... 55/459 R X |
| 860,999 | 7/1907 | Sunden ................................. 55/457 |
| 1,231,371 | 6/1917 | Jones ............................. 55/459 R X |
| 1,267,715 | 5/1918 | Tutwiler ......................... 55/415 X |
| 1,362,025 | 12/1920 | Macaulay ....................... 55/457 X |
| 1,756,909 | 4/1930 | Cram ............................. 55/416 X |
| 2,502,916 | 4/1950 | Bar ................................. 209/144 X |
| 2,975,896 | 3/1961 | Hirsch ............................. 209/211 |
| 3,405,803 | 10/1968 | Bahr et al. ....................... 209/211 |
| 3,672,503 | 6/1972 | Mark ............................... 209/144 |
| 3,826,065 | 7/1974 | Labbe ............................. 55/460 X |
| 3,902,876 | 9/1975 | Moen et al. .................... 55/457 X |
| 4,008,059 | 2/1977 | Monson et al. ................. 55/457 X |

FOREIGN PATENT DOCUMENTS

| 1126118 | 11/1956 | France ............................ 209/211 |
| 1314386 | 12/1962 | France ............................ 209/211 |
| 1375154 | 9/1964 | France ............................ 55/17 |
| 411123 | 5/1934 | United Kingdom ............ 55/412 |
| 733786 | 7/1955 | United Kingdom ........... 209/144 |

Primary Examiner—Kathleen J. Prunner
Attorney, Agent, or Firm—W. G. Fasse; D. F. Gould

[57] ABSTRACT

Solid components such as dust particles having a lighter density are separated from a flowing medium, such as a gas, wherein the dust is suspended. The gas has the lightest density. For this purpose, the flowing medium which includes the gas and the solid components suspended therein, is detoured in a bent channel and partially introduced into a whirling chamber, which contacts the bent channel along its entire axial height to communicate with the channel along its inner bent portion, whereby the flow produces a centrifugal field in said whirling chamber. Two immersion pipes extend coaxially into the chamber, one pipe from each end. The pipes are connected to suction means, such as fans, for sucking the lighter component out of the whirling chamber. These pipes extend deep enough into the central region of the chamber so that the sucking of the lighter component out of the chamber takes place at said central region of the whirling chamber.

11 Claims, 8 Drawing Figures

APPARATUS AND METHOD FOR SEPARATING A SPECIFIC LIGHTER COMPONENT FROM A FLOWING MEDIUM

CROSS REFERENCE TO RELATED APPLICATION

The present application is a continuation-in-part application of my copending application Ser. No. 717,148, filed on Aug. 24, 1976, now abandoned.

BACKGROUND OF THE INVENTION

The invention relates to a method and to an apparatus for separating specifically lighter, solid components from a flow, such as a gas flow having these lighter components suspended therein, whereby the flowing medium is the gas and the solid components suspended in the gas which has the lightest density of all the components forming the flowing medium. The flow travels through a bent channel in which it is detoured and whereby at least a portion of the flow is introduced into a whirling chamber which is arranged so that the channel and the chamber contact each other along a tangent. Preferably the chamber is arranged in the inner curve of the bent channel in direct contact and communication with the channel, whereby a centrifugal field is produced in the whirling chamber. Two immersion pipes reach into the chamber coaxially and in a mirror-symmetrical manner relative to the central plane of the chamber for sucking the components of lighter density out of the chamber.

German Patent Publication No. 2,233,437 describes and illustrates a method of the above type. In the present context, it is the aim to separate the component or components of lower density from a flowing medium as efficiently as possible, for example, to clean dust out of the air. In this example of dust contaminated air, an efficient cleaning means that the quantity of clean air sucked out of the whirling chamber should be as large as possible in order to accumulate as much dust as possible in the main stream of the flowing medium. The main stream and the accumulated dust therein, is then supplied to a direct separator. Several attempts have been made to improve the efficiency of the just described prior art method. One such attempt is described in German Patent Publication No. 2,160,415.

British Pat. No. 733,786 (Waagner-Biro) discloses a whirling chamber dust cleaning method wherein axially extending outlet ports reach only slightly into the whirling chamber apparently to avoid secondary current flows. Contrary thereto the invention uses secondary current flows to increase the cleaning efficiency as will be explained in detail below. The British Pat. No. 733,786 provides tangential exit ports adjacent the ends of the chamber for the removal of the fine dust. These exit ports are necessary because secondary currents are suppressed.

U.S. Pat. No. 474,490 (Walter) shows a whirling chamber with tangential influx of the flowing, contaminated medium and axial withdrawal of the gas. The axially extending exit pipes are axially adjustable in the extent to which these pipes reach into the chamber. However, the entire gas volume must exit through the axial pipes so that no advantage is taken of the formation of secondary current flows.

OBJECTS OF THE INVENTION

In view of the above, it is the aim of the invention to achieve the following objects, singly or in combination:

to improve the efficiency of a method as described above in a simple manner so that the quantity of the lighter components becomes larger and so that the accumulation of components of larger density in the main stream is increased;

to provide an apparatus of the type described above which works more efficiently than prior art devices by making advantageous use of secondary current flows; and to superimpose three different flows in the whirling chamber, namely, a primary eddy flow, a secondary eddy flow and a sink flow or flows.

SUMMARY OF THE INVENTION

According to the invention, there is provided a method for separating a specifically lighter component from a gas flow in which particles or materials are suspended whereby the gas flow is detoured into a bent channel so that a portion of the gas flow is introduced into a whirling chamber which is arranged on the inside curve of said bent channel. The vortex or whirling flow in said whirling chamber has a height corresponding to the axial height of the whirling chamber to contact the bent flow in said bent channel along its entire height. A sink flow is generated by suction means extending axially into the central region of the whirling chamber. Thus, the whirling flow or vortex is driven by said bent flow along the entire chamber height on the radially outer side of the whirling flow and centrally the whirling flow is simultaneously driven by said sink flow. Due to this type of driving of the whirling flow by the bent flow over a sector of substantial angular width and over the entire chamber height on the one hand and by the sink flow centrally in the whirling flow, the invention enhances secondary flow effects. This type of flow keeps coarse particles inside the bent channel flow due to centrifugal forces so that these coarse particles pass by the whirling chamber whereas fine particles travel along spiral paths in a layer flow near the chamber bottoms into the whirling chamber where the fine particles are entrained into a helical flow travelling axially toward the central portion of the vortex or whirling flow, said helical flow following spiral path with radii that increase as the spiral helical flow approaches toward the central plane of symmetry of the whirling chamber whereby the fine particles are returned into the bent channel flow and the gas proportion removed by the effect of the suction or sink flow is substantially free of any contaminating particles.

According to the invention, the operation of the flow channel and the whirling chamber is such that a flow system is generated in the whirling chamber which comprises several elementary flows superimposed upon each other in an advantageous manner thereby providing an optimal separation operation. The separation may be further improved by employing groups of pipes reaching into the whirling chamber all the way to said central region from both ends of the chamber in a mirror-symmetrical manner, whereby pipes of decreasing diameters are arranged coaxially relative to each other. A group of pipes may comprise two pipes, whereby the pipe of smaller diameter is arranged inside the pipe of larger diameter. The suction openings of the pipes immersed in the chambers, preferably face each other adjacent to said central region, or in said central region.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
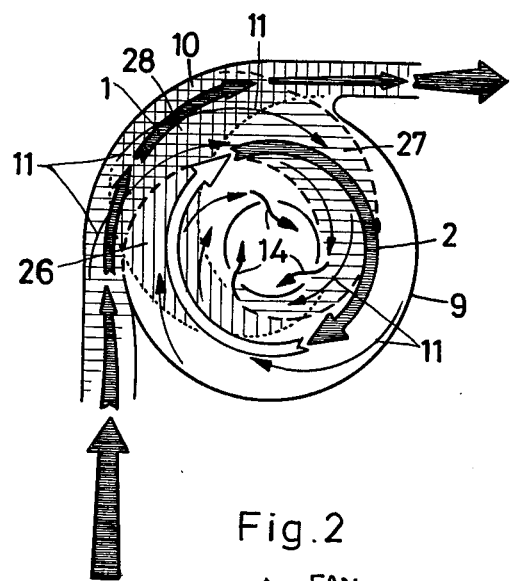
FIG. 1 is a sectional view through an apparatus according to the invention, whereby the sectional plane extends perpendicularly to the longitudinal axis of the apparatus.
Figure 2:
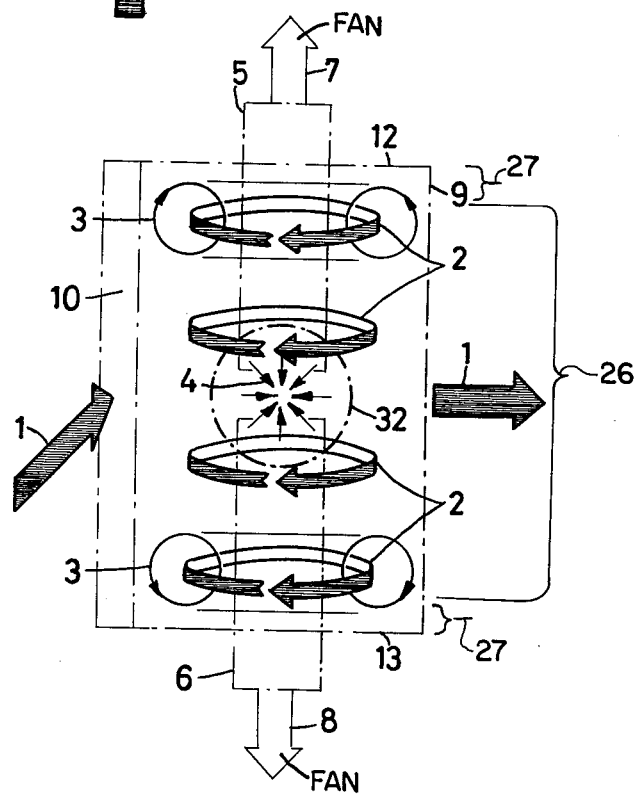
FIG. 2 is a sectional view through the apparatus according to FIG. 1, with the section extending in the axial direction.

FIGS. 1 and 2 illustrate how, according to the invention, particle flows are superimposed on the bent main stream or flow 1 inside the whirling chamber 9 which is substantially cylindrical and which is mirror-symmetrical relative to a central plane extending perpendicularly to the longitudinal axis of the chamber 9 as shown in FIG. 1. The main stream 1, has preferably a rectangular cross-section, and is axially coextensive with the whirling chamber 9. The several flows include the primary eddy flows 2, extending in respective horizontal planes, as best seen in FIG. 2, the pair of circular secondary eddy flows 3 and the sink flow 4. The flows forming the pair of secondary eddys 3 rotate in opposite directions. The sink flow 4 is created because of the suction effect caused by fans 7, 8 connected to the two immersion or suction pipes 5 and 6 reaching into the chamber 9 to closely adjacent the central plane (as shown in FIG. 2). A lower density component of the medium to be treated is sucked out of the chamber 9 in the axially outward direction by the fans 7 and 8 which are of conventional construction and hence not shown in detail.

As stated above, the invention employs the superposition of three different flows in the whirling chamber 9, namely, the primary eddy flow 2 and the secondary eddy flow 3 as well as the sink flow 4. Secondary flows or currents occur in connection with any curved flow due to the centrifugal force and due to friction effects.

The eddy or whirling chamber 9, which has a longitudinal axis and two closed ends through which the pipes 5 and 6 reach, communicates with a flow channel 10 which has a bent elbow shape. The chamber 9 is located on the inside curve of the elbow of the flow channel 10, and communicates over a substantial angular or circumferential length, as shown, for example, in FIG. 1, with the flow channel 10 which extends along the entire axial height of the cylindrical chamber 9 as shown in FIG. 2. The arrows 11 illustrate a flow which occurs close to the end surfaces 12 and 13 of the eddy or whirling chamber 9, due to the superposition of the primary eddy flow 2 and the secondary eddy flow 3. The strength of the secondary eddy flow 3 is increased by the primary eddy flow 2 and by the sink flow 4. Said flow 11 extends into the area of the flow channel 10, as shown by the flow arrow 11, whereby these flows 11 merge into the main flow 1 to return even the lightest particles back into the main flow 1. The arrows 14 (FIG. 4) illustrate a superposed flow resulting from the particle eddy flow 2 and the sink flow 4. The secondary eddy flow 3 also influences the superimposed flow as shown by the arrows 14.

A sink flow such as sink flow 4 constitutes a point in a three-dimensional flow into which fluid is presumed to flow uniformly from all directions. Thus, the sink point in FIG. 2 is defined by the arrows 4. The main flow 1 enters the flow channel 10 of the whirling chamber 9 and is bent to tangentially pass along the whirling chamber proper, where the latter communicates with the flow channel 10. This tangential main flow 1 causes the generation of the above mentioned primary eddy flow 2. Secondary eddy flows 3 are generated by the primary eddy flow 2. The total flow is further supported by the sink flow 4 in the central region of the whirling chamber 9. As seen in FIG. 2 and even better in FIG. 4 of the present disclosure, the various flows form a pattern extending substantially mirror symmetrical to a central plane dividing the separating whirling chamber 9 into an upper and lower half. The sink flow 4 is generated in the central region of the whirling chamber 9 and that region extends radially inwardly and mirror-symmetrically above and below the horizontal central plane which is thus a plane of symmetry. The just described flow pattern is such, that, starting from the inlet ports 19 and 20 of the pipes 5 and 6 shown in present FIGS. 2 and 4, the flow lines extend helically around the pipes 5 and 6 inside the chamber 9 as shown in present FIG. 5. These helical flow lines extend axially outwardly toward the closed ends of the chamber 9 through which the pipes 5 and 6 extend. The flow continues in spiral lines along the closed ends of the chamber 9 radially outwardly until these spiral lines, shown at 11 in FIG. 5, reach into the main flow 1. Thereafter, the spiral flow continues axially inwardly as guided by the inner surface of the walls of the chamber 9. In this manner, the sprial flow enables the sink flow 4 to suck out a portion of the main flow 1 and to return lighter particles 24 into the main flow 1.

According to the invention the r.p.m. of the primary eddy flow 2 is approximately 50,000 r.p.m. The resulting radial acceleration is approximately 90,000 times the acceleration caused by gravity. This is a surprising result compared to prior art centrifugal separators, wherein the acceleration is in the range of 2,000 to 4,000 times the acceleration caused by gravity. The high r.p.m. of the freely rotating primary eddy flow in the whirling chamber is achieved according to the invention by the combination of the tangential curved wall flow 1 through the flow channel 10 extending over the entire chamber height, with a concentrated sink flow 4 in the central zone of the whirling chamber 9. The sink flow 4 is substantially localized to a point due to the fact that the inner free ends of the suction pipes 5 and 6 extend all the way down into the central zone mirror symmetrically relative to the central plane of symmetry. Simultaneously the suction pipes or rather the outer surfaces of the suction pipes constitute a guide surface for the helical flow 11 illustrated in present FIG. 5.

Further, the circumferential length or angular width of the interface between the bent flow channel and the whirling chamber must be sufficient to achieve such high r.p.m.

Figure 3:
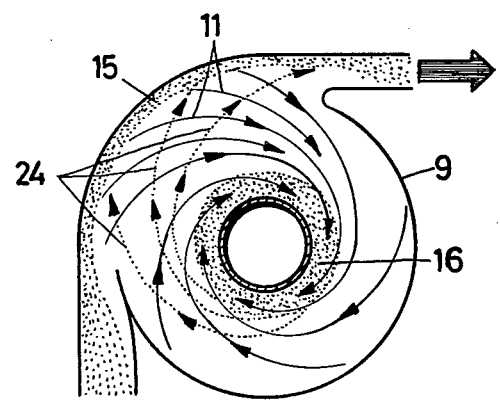
FIG. 3 illustrates the main separation zones of the apparatus operated according to the invention.
Figure 4:
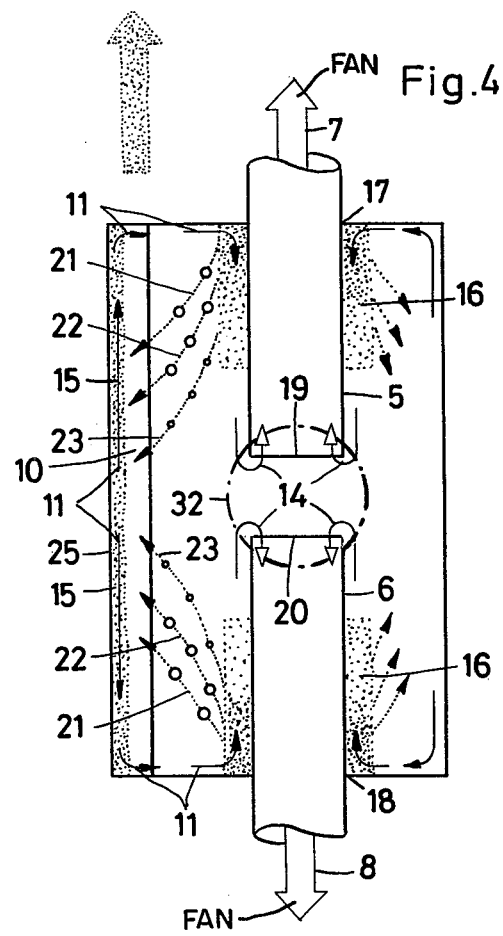
FIG. 4 illustrates a longitudinal section through the apparatus of FIG. 3.

FIGS. 3 and 4 illustrate the effects caused by the combination of flows described above. Two different main separation zones are created, according to the invention. One separation zone 15 separates coarser particles from the gas to be cleaned. The coarse particles are retained in the bent flow channel 10. The fine particles are separated from the gas to be cleaned in the separation zone 16. The fine particles travel into the whirling chamber 9 and along particle paths or trajectories forming ever increasing spirals, which bring the fine particles back into the bent flow channel 10. Each of these zones 15 and 16 is divided into two partial zones, due to the mirror-symmetrical arrangement of the immersion pipes 5 and 6, relative to the central horizontal plane extending through the apparatus. In the coarse separation zone 15, the coarser and heavier particles are caused to by-pass the eddy or whirling chamber 9, whereby these heavier particles remain in the main stream 1 in the bent flow channel 10 the exit end of which also extends over the entire axial height of the chamber 9. The finer particles of lighter density are carried into the eddy chamber 9 by the superimposed flow 11, whereby these lighter particles travel to areas 17 and 18 where the immersion pipes 5 and 6 enter into the chamber 9. From these areas the lighter particles travel, carried by the superposition flow 11 around the immersion pipes 5 and 6, along said helical path toward the suction ports 19 and 20, however, not into said suction ports 19 and 20 due to said increasing spirals which bring the fine particles back into the bent flow channel 10.

Figure 5:
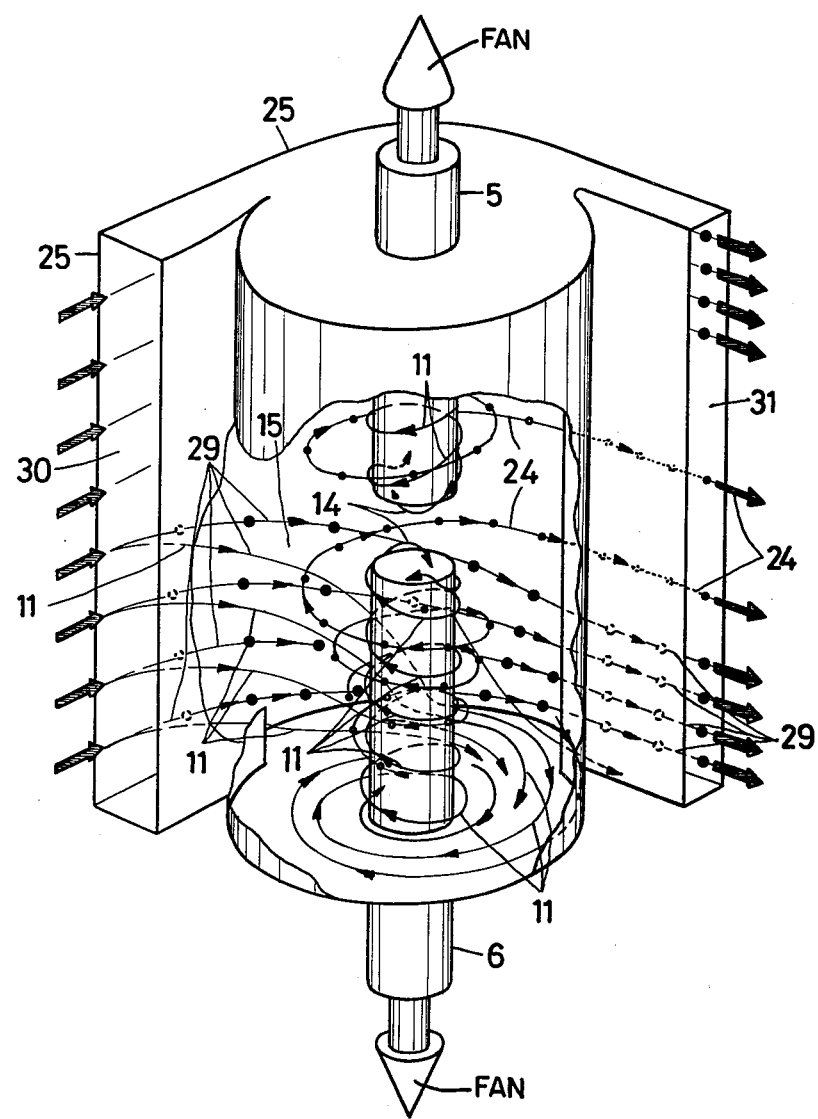
FIG. 5 is a perspective view of the present apparatus with wall parts broken away to illustrate the flow lines and particle trajectories.

FIG. 5 illustrates the just described helical flow in a perspective manner. Due to the fact that flow lag forces are not or hardly present, the particles in this flow 11 are subject solely or almost solely to centrifugal forces effective in the radially inward direction, whereby said helical particle paths result. These helical particle paths increase their radial spiral diameter as the paths approach said central zone of symmetry between the two suction ports 19 and 20. Stated differently, the radial spiral diameter increases with each turn around the respective immersion pipes 5 and 6, whereby the just described flow returns the lighter particles back into the main flow 1. However, due to different particle sizes and weights, different centrifugal forces are effective. Thus, the heavier particles are returned faster into the main flow 1 than the lighter particles, which take longer for their return into the main flow. This fact is indicated in FIG. 4, by the arrows 21, 22, and 23. The diameter increase of the spiral of the helical particle flow paths is shown by the arrow 24 in FIG. 3.

The separation of the finer, lighter particles from the gas to be cleaned in the zone 16 by returning these particles into the main flow 1 is completed just ahead of the suction ports 19 and 20 of the immersion pipes 5 and 6. As a result, the superposition flow 11 is free of suspended particles at this point and continues its flow toward the suction ports of the immersion pipes where it merges into the superposition flow 14 which is sucked off through the immersion pipes 5 and 6 by the fans 7 and 8. FIG. 4 further shows that the superposition flow 11 continues its travel along the curved outer wall 25 of the main flow channel 10, said continuing flow being mirror-symmetrical to the respective preceding flow.

As shown in FIG. 1, the particles which emerge on helical or spiral shaped particle trajectories from the eddy chamber 9 reenter the main flow channel 10 in the crosshatched area 26. The superposition flow 11, which leaves the main flow channel 10, to enter on a spiral or helical path into the eddy chamber 9, travels through the hatched area 27. The two flow areas 26 and 27 are located at different elevations, having regard to the entire height of the chamber 9. Thus, the flow area 27 is located in two partial regions at the end walls 12 and 13 of the eddy chamber 9, whereas the flow area 26 is located in the middle zone of the eddy chamber 9 between the flow areas 27. Accordingly, in the plan view of FIG. 1, the two areas 26 and 27 overlap in the square-hatched area 28. FIG. 2 shows the areas 26, 27 at said different elevations relative to the height of the chamber 9.

FIG. 5 illustrates perspectively the separation of the coarse particles from the fine particles. The arrows 11 again illustrate the mirror-symmetrical superposition flow along the outer wall 25 of the main flow channel 10. The coarse particles are separated from this flow 11 along particle trajectories 29 which travel between the eddy chamber entrance 30 and the chamber exit 31 along the curved outer wall 25 of the main flow channel 10 with ever decreasing spacing between these trajectories 29 under the influence of the superposition flow 11. The superposition flow 11, which continues its travel about the immersion pipes 5 and 6 along a helical path, merges into the superposition flow 14 as it approaches the suction ports of the immersion pipes 5 and 6. The finer or lighter particles are separated from the helical flow 11 on further helical and spiral particle trajectories 24, which have an increasing diameter as described above.

In the light of the foregoing disclosure, it will be noted that the flow and separation combination according to the invention, can be established only in that the two immersion pipes 5 and 6 extend with their inner free ends or suction ports 19 and 20 into the central area or zone 32 in the eddy chamber 9, as shown in FIGS. 2 and 4.

Figure 6:
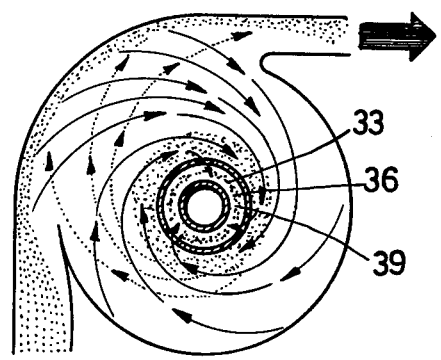
FIG. 6 is a view similar to that of FIG. 1, but showing an apparatus with coaxial suction pipes.
Figure 7:
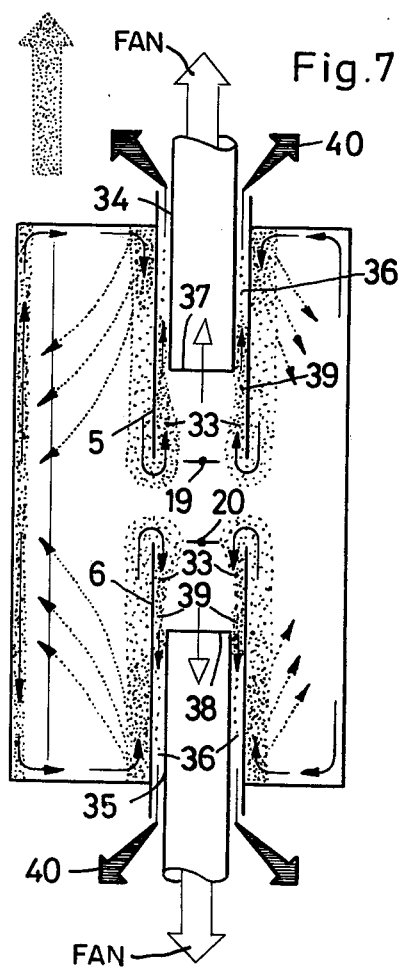
FIG. 7 is a longitudinal section through the apparatus of FIG. 6.

In case the separation of the finest and lightest particles in the immersion pipes 5 and 6 should not be complete, that is, if such particles should have been sucked into the pipes 5 and 6, the invention provides in the embodiments of FIGS. 6 and 7, a further separation zone 33 for the separation of the finest particles. Thus, additional or inner pipes 34 and 35 of smaller diameter than the pipes 5, 6, are concentrically positioned in the immersion pipes 5 and 6 whereby a ring space 36 is formed between the outer pipes 5, 6 and inner pipes 34, 35. In order to properly define the separation zone 33 for the finest or lightest particles, it has been found to be advantageous to keep the inner free ends or suction ports 37 and 38 of the inner immersion pipes 34 and 35 displaced inwardly relative to the suction ports 19 and 20 of the outer pipes 5 and 6. Due to the ring space 36, it is possible to suck off the finest particles in a thin, ring shaped flow layer 39 as indicated by the arrows 40. In any event, two or more concentrically arranged pipes form a group of pipes.

It is advantageous to provide means for adjusting the position of pipes 5, 6 as well as 34 and 35 relative to each other and relative to the chamber 9. Such adjustment of the pipe position may be accomplished by conventional means, for example, a rack and pinion means or the like, and the pipes may also be locked in position after their adjustment. Conventional locking means could be used.

The further treatment of the coarse and finest particles, as they are separated from the medium, will depend on the particular circumstances and requirements, for example, the fine particles as well as the coarse particles of the main flow may be supplied to a further separator for collection.

Figure 8:
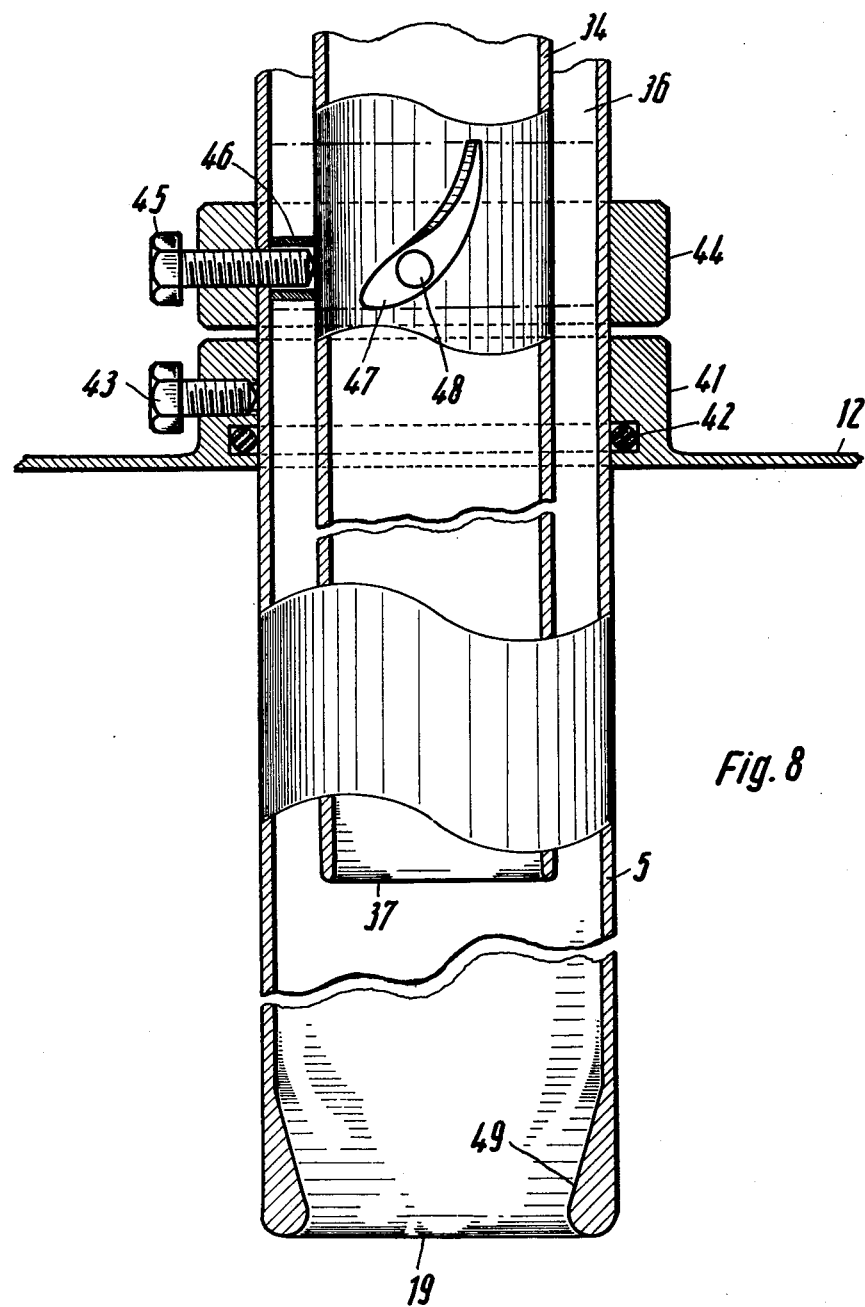
FIG. 8 shows on an enlarged scale the adjustment and locking means for coaxial pipes.

FIG. 8 shows on an enlarged scale a sectional view through two coaxial pipes 5 and 34 with the ring space 36 therebetween. Both pipes are adjustable in the longitudinal axial direction relative to each other and relative to the eddy chamber 9 of which only the end wall 12 is shown. A guide collar 41 with a sealing ring 42 therein guides the outer pipe 5 for axial up and down adjustment which may, for example, be done by hand or any other suitable mechanical means. Several screws 43 in the collar 41 and circumferentially distributed, lock the pipe 5 in any desired position. The inner pipe 34 is guided inside the pipe 5 by bushings 46 or by flow guide wings 47, several of which would be distributed about the circumference, and held by respective screws 45 extending through the collar 44 and into threaded holes 48 or through the bushings 46, whereby the pipe 34 is movable axially relative to these bushings 46 or wings 47 when the screws 45 are not tightened. Incidentally, the port ends of the pipes may be provided with a flow facilitating profile 49, if desired.

The invention is not limited to a whirling or eddy chamber with a substantially cylindrical, primary eddy flow 2. The invention may be practiced with primary eddy flows having any desired shape, for example, the primary eddy flow may have a ring shape. Thus, although the invention has been described with reference to specific example embodiments, it will be appreciated, that it is intended to cover all modifications and equivalents within the scope of the appended claims.

What is claimed is:

1. Apparatus for separating a specifically lightest component from a flowing medium having suspended therein components of different densities, said components including gases and particles comprising substantially cylindrical whirling chamber means having an axial length along a longitudinally extending axis and two closed ends as well as a central plane of symmetry intermediate said closed ends, said central plane of symmetry extending at right angles relative to said longitudinal axis, bent flow channel means forming inlet and outlet means and having an inner curve directly communicating tangentially with said substantially cylindrical whirling chamber means over the entire axial length of said substantially cylindrical whirling chamber means and along an unobstructed interface of a circumferential length sufficient to generate by a flow in said bent channel means a centrifugal field which positively drives a primary eddy flow (2) and a secondary eddy flow (3) in said substantially cylindrical whirling chamber means, and suction means comprising fan means and at least two suction pipes having outer ends connected to said fan means and inner free ends reaching mirror-symmetrically into said substantially cylindrical whirling chamber means through each of said closed ends to a central region through which said central plane extends, said substantially cylindrical whirling chamber means and said suction pipes forming ring spaces inside said substantially cylindrical whirling chamber means for guiding said primary and secondary eddy flows along a helix (11) around said suction pipe in said substantially cylindrical whirling chamber means, each suction pipe extending coaxially with said longitudinal axis of said substantially cylindrical whirling chamber means, each suction pipe reaching into said substantially cylindrical whirling chamber means so close to said central plane that the suction of said fan means through said suction pipes creates a sink flow (4) intermediate the inner free ends of said suction pipes for withdrawing the specifically lightest component from said central region, said sink flow cooperating with said flow in said bent channel means in driving said primary and secondary eddy flows, said sink flow and said primary and secondary eddy flows cooperating in said separating by creating spiral particle trajectories (24) the diameter of which increases from the ends of said substantially cylindrical whirling chamber means toward said central plane whereby said components of different densities are returned into said flowing medium and the specifically lightest component is withdrawn through said suction pipes.

2. The apparatus according to claim 1, wherein said suction means comprise second suction pipes (34, 35) located coaxially inside said first mentioned two suction pipes and reaching into said substantially cylindrical whirling chamber means from each end thereof, whereby coaxially arranged suction pipes extending from the same end of the whirling chamber form a group, and wherein a ring gap is provided between two pipes of the same group.

3. The apparatus according to claim 2, wherein the suction pipes of a group are axially shiftable and lockable in fixed positions relative to each other.

4. The apparatus according to claim 2, wherein said first mentioned and second suction pipes have inwardly facing free, open ends which are axially displaced relative to each other so that one pipe of a group reaches inwardly toward said central plane farther than another pipe of said group.

5. The apparatus according to claim 2, wherein the suction pipes of each group have inwardly decreasing diameters, and wherein a suction pipe with a smaller diameter is located with its open free end more remote from said central plane than a suction pipe with a larger diameter.

6. The apparatus according to claim 2, wherein the second suction pipes of the pipes of a group are provided with a number of flow guide means which, on the one hand guide the flow in the ring gap between adjacent suction pipes, and which on the other hand slidably engage the inner surface of the adjacent radially outwardly located suction pipe.

7. The apparatus according to claim 1, wherein said inner free end of each suction pipe has a flow facilitating profile, and wherein said flow channel means has a substantially rectangular cross-section.

8. The apparatus of claim 1, wherein said suction means comprise second suction pipes arranged coaxially inside said first mentioned suction pipes in such a manner so as to define a ring gap between the suction pipes at each end of said whirling chamber means, said second suction pipes having free ends within said substantially cylindrical whirling chamber means which terminate within the respective first mentioned suction pipes, and whereby components of the flowing medium may be withdrawn from said second suction pipes and from said ring gaps at each end of said substantially cylindrical whirling chamber means.

9. A method for separating a specifically lightest component from a flowing medium having suspended therein components of different densities, said components including gases and particles, comprising the steps of directing a main flow of said medium along a bent flow channel means to communicate tangentially with a whirling chamber over the entire axial length of said whirling chamber and along a sector of a circumferential length sufficient to produce by said main flow a centrifugal field which causes and drives a primary eddy flow (2) and a secondary eddy flow (3) in said whirling chamber, unobstructedly maintaining the communication between said bent flow channel means and said whirling chamber on an inside curve of said bent flow channel means, generating by axially effective suction means a sink flow centrally in said whirling chamber, said main flow and said sink flow cooperating in driving said primary and secondary eddy flows causing by the combination of said primary and secondary eddy flows and said sink flow a spiral particle trajectory having a diameter which increases from the ends toward the center of said whirling chamber whereby said components of different densities are returned into said flowing medium in said bent flow channel and effecting by said axially effective suction means the withdrawal of said specifically lightest component from said whirling chamber in both axial directions through separate pipe means extending axially into the central axial region of said whirling chamber from both axial ends thereof whereby said primary eddy flow and said secondary eddy flow as well as said sink flow cooperate in said separation, said separate pipe means guiding said primary eddy flow in said whirling chamber around the central axis thereof.

10. The method of claim 9, wherein said step of directing comprises directing said flow from said bent flow channel means to said whirling chamber by way of a single substantially rectangular cross-section opening, said opening comprising the sole communication path between said bent flow channel means and said whirling chamber.

11. The method of claim 10, wherein said main flow and said sink flow rotate said primary eddy flow at an r.p.m. of about 50,000.

* * * * *